March 31, 1970 — K. GOETZ — 3,503,310
METHOD OF MAKING A MULTILAYERED PAPER CONTAINER
Filed Feb. 26, 1968 — 2 Sheets-Sheet 1
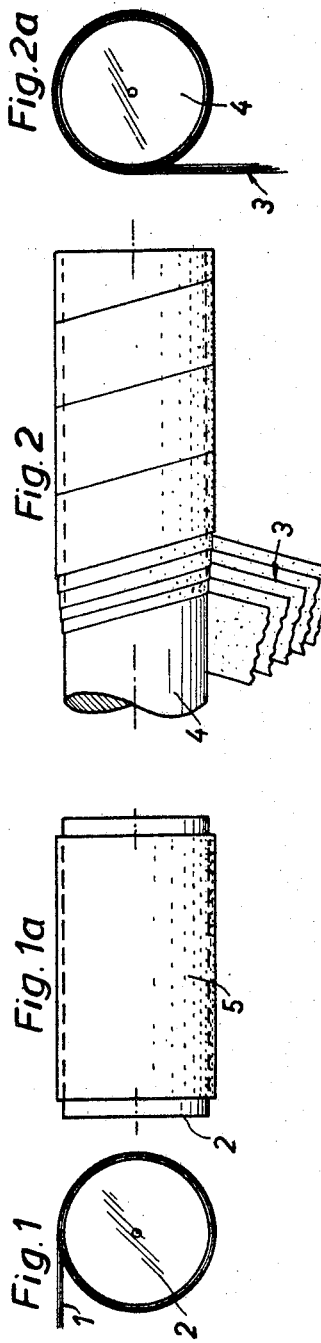
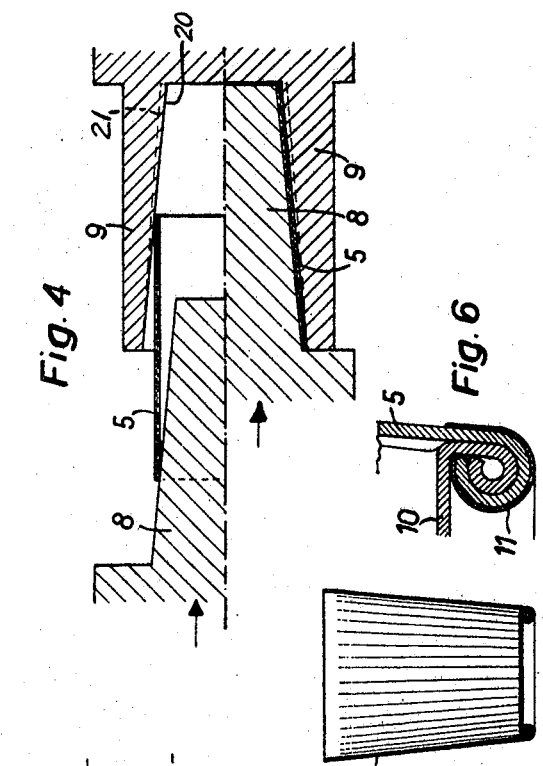
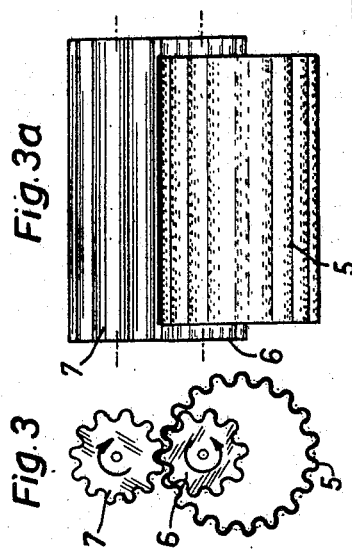
KURT GOETZ
INVENTOR.
BY Jesse D. Reingold
HIS ATTORNEY March 31, 1970     K. GOETZ     3,503,310
METHOD OF MAKING A MULTILAYERED PAPER CONTAINER
Filed Feb. 26, 1968     2 Sheets-Sheet 2
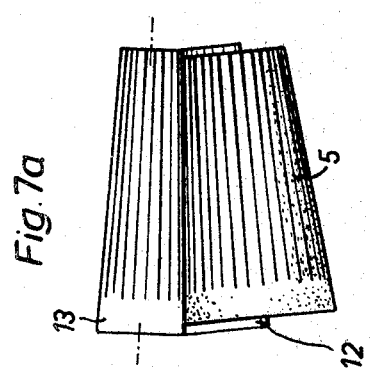
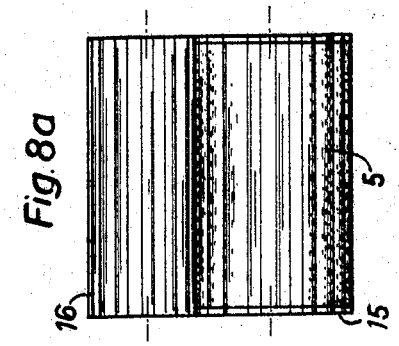
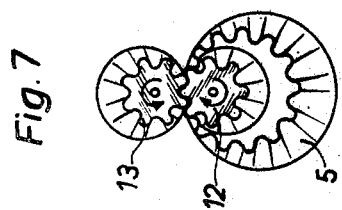
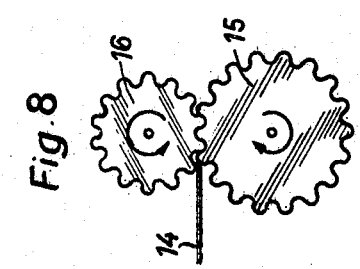
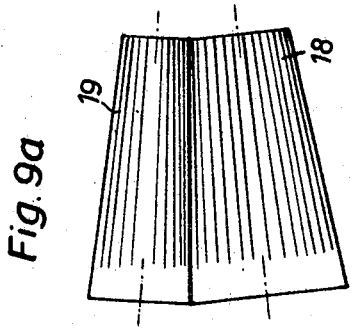
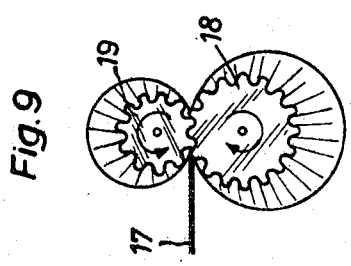

United States Patent Office 3,503,310
Patented Mar. 31, 1970

3,503,310
METHOD OF MAKING A MULTILAYERED PAPER CONTAINER
Kurt Goetz, Zofingen, Aargau, Switzerland, assignor to Impragnieranstalt A.G., Zofingen, Aargau, Switzerland
Filed Feb. 26, 1968, Ser. No. 708,193
Claims priority, application Switzerland, Feb. 28, 1967, 2,923/67
Int. Cl. B65h
U.S. Cl. 93—94                9 Claims

ABSTRACT OF THE DISCLOSURE

A multilayer conical container is made by winding a strip of laminated paper material on a mandrel to obtain a tube, and the tube shell is passed between corrugated forming tools to provide axially extending corrugations to the shell, the corrugations gradually decreasing in depth from one end of the tube shell towards the other end, whereby to impart a cone-shape to the shell.

---

The invention relates to a multilayered conical paper container and to a method for producing the same.

It is known to shape containers conically, so that they can be piled up one within the other when they are not filled and have no cover, so that their storage before being used only requires little space. When relatively large containers having a content of several kilograms are to be produced from paper or paper-like material, it is necessary to impart a sufficient rigidity to the material, which can be obtained either by the use of a paper of corresponding wall thickness, or by profiling of a weaker material, for example forming a container with corrugated or like shaped walls.

When a conical container shall be produced, it is conventional practice for making the conical shell to cut out a development thereof from the provided material and to connect two edges of the development with each other. The development thus forms a portion cutout over a certain angular extent from an annular blank. For producing a multilayered container it would be possible to cut out several simliar developments from a web, however, this can be done only with a loss of material which is scrapped due to cutting. By superposing similar shell developments, a multilayered conical container is formed which has smooth walls.

The present invention has as its object to provide a container without waste from a continuous web of paper or similar material, the shell of which container, besides the conical shape, also has a profiled cross section for increasing its rigidity. Profiling is effected by forming vertically extending grooves on the shell, which, by a more or less deep embossing, allow the formation of a conical shell.

According to the invention the shell of the container consists of a paper web having a plurality of layers bonded to each other by adhesive, said shell being provided with longitudinally extending corrugations, said corrugations being of feeble depth in the region of the upper edge of the container and gradually increasing in depth towards the bottom edge of the container to impart the conical shape to said shell, and said bottom consisting of card board and having its marginal portion rolled inward together with the lower end portion of said shell, the rolled-in portions of the bottom and the shell being secured together by an annular profiled metal band.

The method for the production of a multilayered conical paper container comprises providing a paper web with adhesvie, winding said web in several layers on a mandrel to provide a closed shell, passing said shell between two oppositely rotating corrugated forming tools pressed against each other and towards the shell to impart a conical shape to the shell, and attaching a bottom member to said conical shell.

Preferably, the length of paper web required for a shell will be wound straight on a cylindrical mandrel, so that the paper web edges will be superposed. In a modification of this kind of winding, the length of paper web required for a shell may also be helically wound on a mandrel, so that the paper web edges run helically about the mandrel, a cylindrical shell then being severed from this winding by two plane parallel severing cuts. In a further modification of the method according to the invention, the winding of a length of paper web required for a shell and the passage between two oppositely moving forming tools provided with grooves can be effected simultaneously, by winding the glued length of paper web required for a shell straight on a mandrel provided with longitudinal grooves, which rotates together with a grooved oppositely moving pressure roller. It can be of like convenience to modify the steps to be effected simultaneously also in such manner that the length of glued paper web is wound on a conical grooved mandrel which rotates together with a conical, grooved and oppositely moving pressure roller, the conical mandrel having a grooving which, in the direction towards the smaller diameter, uniformly becoming deeper, whereby the shell receives its final shape by passing between the oppositely moving forming parts.

When the required glued length of paper web has been wound straight on a cylindrical mandrel, whereby a smooth-walled cylindrical outer surface is formed, this cylindrical outer surface can be conveniently placed over a grooved cylindrical roller of smaller diameter which, together with a cylindrical and grooved counter roller bearing from the outside against the surface, forms the pair of forming tools, whereby an axially extending grooving of the cylindrical surface is obtained by opposite rotation of the rollers. The same procedure can be obtained with like advantage with such a cylindrical surface which had been formed by a helical winding of a glued length of paper web.

The grooving of the shell, however, can also be made in such manner that the shell obtained by straight or helical winding is placed on a conical grooved mandrel, the diameter of which at every place is smaller than the diameter of the shell, and that this conical mandrel, together with a further conical mandrel pressed from the outside against the shell, which two mandrels together constituting the pair of forming tools, are oppositely rotated, the conical mandrels being provided with grooving gradually decreasing in depth towards the greater diameter. In this manner, a conical shell having a grooving can be produced in the final shape.

In order to impart a conical shape to a cylindrical grooved shell, this latter can be conveniently expanded in a heated cone matrix comprising inner and outer portions, in such manner that the grooves will decrease in depth in the direction towards the greater diameter of the conical shell thus formed.

The method for producing a multilayered conical paper container is explained in more detail in the following description with reference to the accompanying drawings, in which:

FIGURES 1 and 1a illustrate the straight winding of the paper web on a cylindrical mandrel, FIGURES 2 and 2a illustrate the helical winding of the paper web on a cylindrical mandrel, FIGURES 3 and 3a represent the passing of the cylindrical shell between a pair of forming tools, FIGURE 4 is a sectional view of a heated conical mould for the expansion of the cylindrical grooved shell, FIGURE 5 shows the conical container provided with a bottom in vertical section, FIGURE 6 shows the connection of bottom and shell in vertical section drawn to a larger scale, FIGURES 7 and 7a show the passing of the cylindrical shell between a pair of conical forming tools provided with grooves for forming a conical corrugated shell, FIGURES 8 and 8a show the simultaneous winding-up of the paper web to a shell between a pair of forming parts provided with ribs, FIGURES 9 and 9a show the simultaneous winding up of the paper web and its passage between a pair of conical forming tools provided with corrugations.

According to FIGURES 1 and 1a, the glued length of paper web 1 required for one shell is wound straight on a mandrel 2, so that a smooth-walled cylindrical shell is formed. A cylindrical shell can also be produced according to FIGURES 2 and 2a, by winding a glued paper web 3 on a mandrel 4, so that the edges of the paper web run helically around the mandrel, whereafter a cylindrical shell is severed from the winding by two plane parallel severing cuts. According to FIGURES 3 and 3a, such a cylindrical, closed shell 5 is placed over a cylindrical roller 6 provided with grooves, which roller, together with a roller 7 formed in similar manner and pressed from the outside against the shell 5, forms the pair of forming tools between which the shell is passed, the shell being grooved by the ribs of the forming parts intermeshing in the manner of gearing. According to FIGURE 4, the cylindrical shell 5 provided with ribs is expanded in a heated mould consisting of a conical inner mandrel 8 and an outer part 9 having a conical internal bore, in such manner that the grooves in the direction towards the greater diameter of the resulting conical shell become smaller, i.e., the grooves become flatter in the upper region of the shell. The corrugations of the mold 9 are illustrated with reference numeral 20 designating the internal base of the mold and reference numeral 21 designating the corrugations which are deepest at the inner end of the conical bore. This cone-shaped shell in its finished shape is connected to a bottom part 10 according to FIG. 5 and as it is represented on a larger scale in FIG. 6. Hereby a marginal zone of the circular bottom part 10 is bent downwardly substantially at right angles and, together with the lower marginal portion of the shell 5 which bears against it from the outside, is rolled inwardly below the bottom part, and the rolled-in marginal portions are fixed, in a manner known per se, by a surrounding metal band 11 extending on the outside of the shell until to the lower face of the bottom part.

According to FIGURES 7 and 7a, a cylindrical shell produced according to FIGURES 1 and 1a or 2 and 2a, can also be provided with grooves in such manner that it is passed between a pair of conical forming tools 12 and 13 having grooves, and which are oppositely rotating while pressed one against the other, the shell at the same time obtaining its definite grooved and conical shape, since the conical forming parts are provided with a corresponding grooving gradually becoming less pronounced towards the greater diameter. A shell formed in this manner can be provided with a bottom part in the same manner as described according to FIGURES 5 and 6.

Naturally it is also possible to produce the conical shell in such a manner that the glued length of paper web 14 required for a shell according to FIGURES 8 and 8a, simultaneously with the winding on a cylindrical grooved mandrel 15, is passed between an oppositely moving pair of forming tools pressed one towards the other and consisting of the mandrel 15 and the part 16, both members being provided with corresponding corrugations. The cylindrical grooved shell thus formed is expanded in the manner described according to FIGURE 4 to cone-shape.

In a further modification of the method, the operating step of expanding the shell can be dropped when the glued length of paper web 17 required for a shell, according to FIGURES 9 and 9a is passed immediately between a pair of conical forming tools 18 and 19 provided with grooves and thereby winding the paper web on the conical part 18, the pair of conical forming tools being provided with a grooving gradually decreasing in depth towards the greater diameter. It is true that the production of the forming parts provided with grooves in this manner is more expensive than the production of cylindrical grooved forming parts, but with the use of a pair of conical forming tools, the otherwise required heated form for expanding the cylindrical shell becomes unnecessary.

I claim:

1. A method of making multilayered containers, comprising providing a paper web having a plurality of layers bonded to each other by adhesives, winding said web on a mandrel to provide a shell, passing said shell between two opposing rotating corrugated or ribbed forming tools bearing against each other with the ribs of each tool meshing with the grooves of the other mating tool, so as to impart a corrugated shape to said shell, and attaching a bottom member to said formed shell whereby a finished corrugated sidewall container is formed.

2. The method according to claim 1, wherein said web is wound on said mandrel so that the edges of said web are superimposed and disposed parallel to the axis of said mandrel so as to form a smooth-walled cylindrical shell.

3. The method according to claim 1, wherein said web is helically wound on said mandrel so that the edges of said web run helically around said mandrel, and wherein cylindrical shells are severed from said helically wound shell by transversely made parallel cuts.

4. The method according to claim 1, wherein said winding of the web and the corrugating of same is done simultaneously between said pair of corrugated forming tools whereby a unitary corrugated shell is formed.

5. The method according to claim 1, wherein the shape imparted to said shell is cylindrical and wherein said shell has axially extending corrugations.

6. The method according to claim 1, wherein the shape imparted to said shell is conical and wherein said shell has conically extending corrugations.

7. The method according to claim 6, wherein the corrugations gradually decrease in depth in the direction towards the greater diameter of the said conical shell.

8. The method according to claim 5, wherein the corrugations gradually decrease in depth from one end of said shell to the opposite end.

9. The method according to claim 1, wherein the corrugated shell is expanded in a heated cone-shaped mold having corrugations corresponding to those of the corrugated shell, said heated mold imparting to said shell corrugations which gradually decrease in depth in the direction towards the greater diameter of said conical mold.

References Cited

UNITED STATES PATENTS 1,186,466   6/1916   Brown _____ 93—39.1

BERNARD STICKNEY, Primary Examiner

U.S. Cl. X.R.

93—39.1; 156—585; 229—1.5; 264—286